United States Patent [19]

Koziol

[11] Patent Number: 4,848,217
[45] Date of Patent: Jul. 18, 1989

[54] MULTIPURPOSE COOKING RACK

[75] Inventor: Walter Koziol, Antioch, Ill.

[73] Assignee: Moerke Display & Mfg. Co., Inc., Union Grove, Wis.

[21] Appl. No.: 164,387

[22] Filed: Mar. 4, 1988

[51] Int. Cl.⁴ .............................................. A47J 43/00
[52] U.S. Cl. ........................................ 99/426; 99/419; 99/448; 211/181
[58] Field of Search ............. 99/426, 449, 419, 421 H, 99/422, 448, 450; 211/125, 126, 181

[56] References Cited

U.S. PATENT DOCUMENTS

| | | | |
|---|---|---|---|
| 2,222,089 | 11/1940 | Saffell | 99/426 |
| 2,360,026 | 10/1944 | Wall | 99/426 |
| 3,405,631 | 10/1968 | Thomas | 99/449 X |
| 3,566,776 | 3/1971 | Young | 99/426 |
| 3,585,922 | 6/1971 | Peterson | 99/355 |
| 3,665,843 | 5/1972 | Moore | 99/426 X |
| 4,005,646 | 2/1977 | Kruper | 99/450 X |
| 4,238,035 | 12/1980 | Kassanchuk | 211/181 X |

FOREIGN PATENT DOCUMENTS 1519776  8/1978  United Kingdom ................. 99/426

Primary Examiner—Harvey C. Hornsby
Assistant Examiner—O'Leary K.
Attorney, Agent, or Firm—Quarles & Brady

[57] ABSTRACT

A multipurpose cooking rack which can support large sizes of meat when in one position and smaller sizes of food items such as meat and vegetables when in an inverted position. The cooking rack is of a generally V-shaped configuration having combined handle and foot members at the ends as well as food impaling members extending at the sides. The cooking rack is preferably of a wire construction and can be employed in any type of cooking device such as an oven or a gas or charcoal grill.

10 Claims, 1 Drawing Sheet

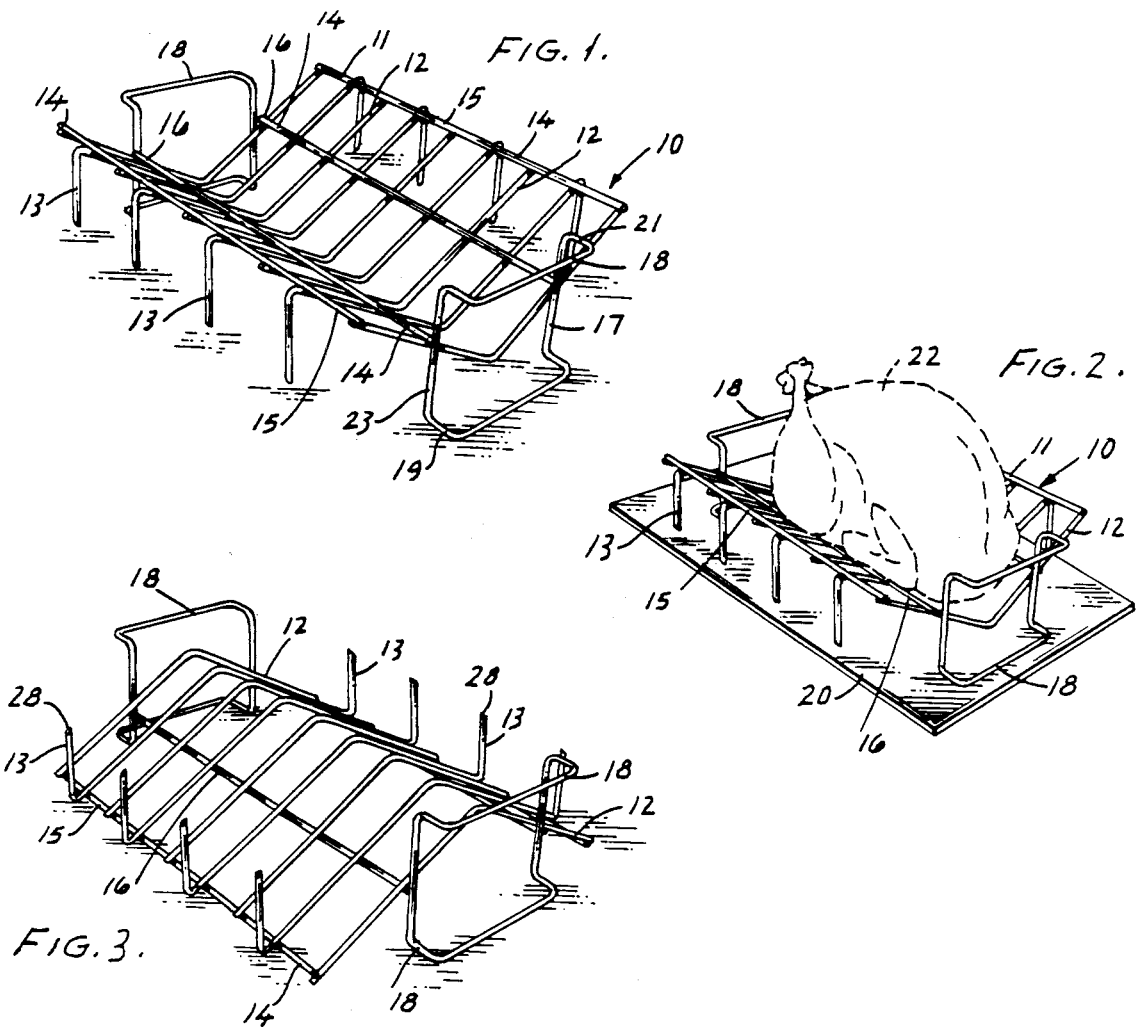
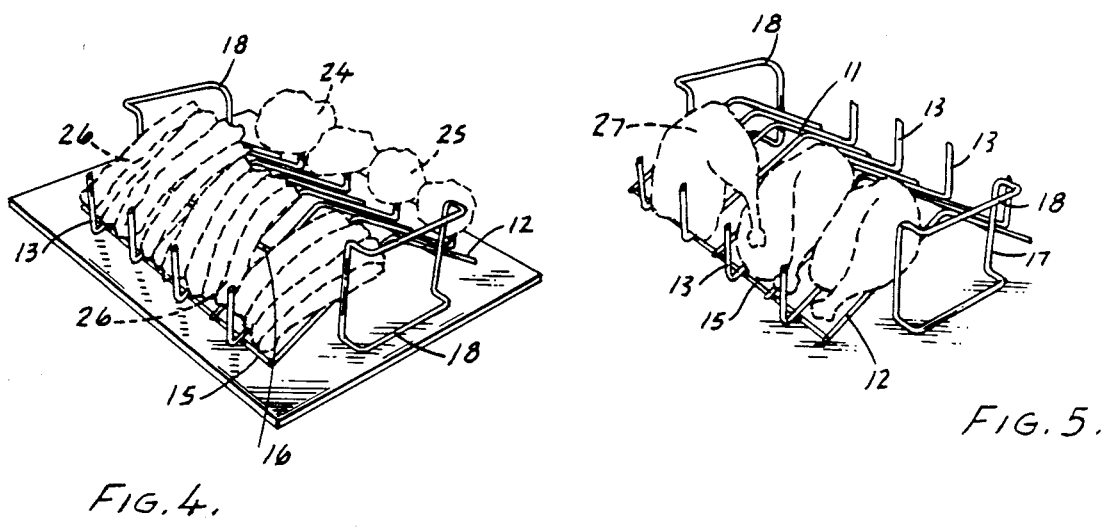

MULTIPURPOSE COOKING RACK

BACKGROUND OF THE INVENTION

This invention relates to a support rack for use in cooking food items. More particularly, the invention reltates to a multipurpose cooking rack which can support meat and vegetable items whether of large or small pieces and can be used in an upright or inverted position in order to accommodate the various sizes of food items. The multipurpose cooking rack of this invention is especially suited for use in conjunction with a gas grill.

There are currently available various types of cooking racks in different geometric configurations. For example, in U.S. Pat. No. 2,205,064 as well as U.S. Pat. No. 2,616,360 there are shown racks with a generally V-shaped configuration. In U.S. Pat. No. 2,205,064 the V-shaped body of the rack is supported by U-shaped support legs. In U.S. Pat. No. 2,616,360 there is indicated a rack which can be raised or lowered on separate leg members. This rack is indicated for use in supporting various types of food items. An inverted rack is shown in U.S. Pat. No. 4,557,188 but it is specifically directed to cooking specific items. U.S. Pat. No. 4,612,851 shows a cooking utensil which is especially adapted for use over a charcoal or a gas-fired grill. U.S. Pat. No. 1,969,601 describes a rack for cooking potatoes while U.S. Pat. No. 3,986,445 illustrates a rack for use in insertion in the body of an animal for cooking. U.S. Pat. Nos. Des. 195,687 and 260,227 show U-shaped and V-shaped cooking racks, respectively.

The prior art does not provide a multipurpose cooking rack which is especially adapted for cooking a variety of food items and is designed to be inverted and supported by handles for this purpose.

It is an advantage of the present invention to provide a cooking rack which in a single rack structure can accommodate different food items of various sizes.

It is another advantage of this invention to provide a cooking rack having opposing handle portions for manipulating the rack as well as for support thereof.

It is still another advantage of the present invention to provide a multipurpose cooking rack of the foregoing type which is useful in various types of cooking apparatus including a gas barbecue grill.

It is yet another advantage of the invention to provide a cooking rack of the foregoing type which is readily manufactured with existing tooling and in an economical manner.

SUMMARY OF THE INVENTION

The foregoing advantages are accomplished by the present multipurpose cooking rack wherein a body portion has a generally elongated configuration in a longitudinal dimension and a generally V-shaped configuration with respect to the longitudinal dimension. A plurality of support members form the body portion and are spaced apart to form openings therebetween with some of the wires forming the V-shaped configuration and extending transversely to the longitudinal dimension. Combined handle and foot members are connected to the ends of the body portion. There are food impaling members extending from the sides of the body portion and in generally the same direction of an apex of the V-shaped configuration. The multipurpose rack can accommodate a large piece of meat when the body portion is positioned with the apex of said V-shaped configuration in a down position and when inverted can accommodate a variety of smaller pieces of meat or vegetables.

In a preferred embodiment, a plurality of wire support members form the body portion and are spaced apart to form openings therebetween. The combined handle and foot members are also formed from wire members with the handle and foot members extending from the ends of the body portion. The food impaling members are also formed from at least some of the wire support members and extend from the sides of the body portion and in the previously indicated direction. They are also of a length to retain food items on the rack.

In another embodiment, the wire support members extend in longitudinal and transverse directions and at least one wire support member extends longitudinally with respect to the body portion between the apex of the V-shaped body and the end portions of the wire support members which extend in the transverse direction. The end portions of the wire support members are connected to the combined handle and foot members.

In still another embodiment, the combined handle and foot members are composed of opposing U-shaped members interconnected by leg portions.

BRIEF DESCRIPTION OF THE DRAWING

A better understanding of the present multipurpose cooking rack will be accomplished by reference to the drawing wherein:

FIG. 1 is a perspective view of the multipurpose cooking rack in one cooking position.

FIG. 2 is a view similar to FIG. 1 except slightly reduced in size and showing the cooking rack supporting a large foot item as well as being supported on a support surface.

FIG. 3 is a view similar to FIG. 1 except showing the rack in an inverted position.

FIG. 4 is a view similar to FIG. 3 except showing the rack supporting various food items as well as being supported on a support surface.

FIG. 5 is a view similar to FIG. 3 except slightly reduced in size and supporting different food items.

DESCRIPTION OF THE PREFERRED EMBODIMENTS

Proceeding to a detailed description of the present invention, a multipurpose cooking rack generally 10 is shown in FIG. 1. It has a body portion 11 composed of a multiplicity of V-shaped wires 12 spaced equidistantly along a longitudinal axis. These V-shaped wires are interconnected by longitudinally extending wires 14 with those wires 15 providing peripheral support. Wires 14 which are intermediate peripheral wires 15 and the apex of the "V" provide the intermediate support wires 16. As been seen in FIGS. 1 and 3 there are two intermediate support wires 16 which are attached to each of the two arm portions of the "V" and extend between the apex and the end portions. Attached to the body portion 11 at the ends thereof are the combined handle and foot members 18. These include the vertical leg portions 17 and 23 interconnected to the U-shaped portions 19 and 21. It will be noted that for stability purposes, the intermediate supports 16 are connected directly at their ends to the handle and foot members 18. This connection is to the vertical leg portions 17 and 23. This is true of both of the handle and foot members 18. Referring specifically to FIG. 3, it wil be seen that the V-shaped wires 12 terminate in upwardly extending portions 13. These will have their ends terminating in a point such as 28 so as to aid in the piercing or impaling of food items.

Referring back to FIG. 2, it will be noted that the cooking rack 10 is of a sufficient size so as to be able to accommodate and support a large size turkey which is shown in phantom lines at 22 and can weigh up to 15 lbs. Larger sizes could also be accommodated but would be difficult to lift. In this instance and for purposes of illustration, the rack 10 is supported over a roasting surface 20 which can constitute a tray or shallow pan in order to catch the drippings from the turkey while it is being cooked. It should be pointed out that the food impaling members 13 will not extend to contact the roasting surface 10. In this manner their sharpened points will not be dulled. The position of the rack with the V-shaped wires 12 in a downward position toward the cooking surface will as indicated support any large size pieces of meat. Obviously, in place of the turkey 22 a large ham or beef roast could be substituted.

As shown in FIGS. 3-5, the rack is in the inverted position and is intended to a accommodate smaller food pieces. In this instance, potatoes and onions 24 and 25 are impaled on the food impaling members 13 while ribs 26 are held over the inverted V-shaped wires. In this manner, the intermediate support 16 will prevent any smaller pieces of food from falling between the V-shaped wires. As specifically shown in FIG. 5, chicken thighs 27 are also easily supported by the upwardly positioned V-shaped wires. Any tendency of the chicken thighs to fall from the rack body portion 11 is restrained by the upwardly extending food impaling members 13.

In utilizing the multipurpose rack 10 it will be obvious that it can be easily manipulated by the handle and foot members 18. Due to the configuration of the U-shaped portions 21 and 19 they are easily gripped. At the same time these U-shaped portions by extending laterally across the ends of the body portion 11 provide stability for the rack whether in the upright position in FIGS. 1 or 2 or the inverted position shown in FIGS. 3-5.

The multipurpose cooking rack 10 is fabricated from wire members which are easily welded to each other. For example, at each instance where the longtudinally extending wires 14 contact the V-shaped wires 12 a weldment is effected. Likewise, the handle and foot members 18 are welded to the intermediate wires 16 at the ends of the wires 16. The U-shaped handle and foot members 18 are easily formed by bending the two U-shaped portions 19 and 21 and then joining the vertical legs 17 and 23. Obviously any number of intermediate wires such as 16 could be employed. Neither is it necessary that the intermediate wires 16 extend in a parallel manner with respect to the outer peripheral wires 15. For example, they could extend in a waveform over the V-shaped wires although this would not be as efficient. Neither is it necessary that the handle and foot members 18 be formed with opposing U-shaped portions 21 and 19. If desired, the U-shaped portions could be eliminated and the vertical legs 17 and 23 joined by length of straight wire although this would not provide the same stability.

Certain food items have been illustrated for use in conjunction with the multipurpose cooking rack. Obviously many other foods can be substituted. For example in the instance of the food implacing wires 13, ears of sweet corn could be implaced thereon for roasting. Similarly hot dogs could be placed thereon for a similar purpose.

It will thus be seen that in the present invention there is now provided a multipurpose cooking rack which can accommodate various types of food and yet allow for easy manipulation during cooking. The multipurpose cooking rack can accommodate large and small pieces of food as well as various types of meat and vegetables. It can be easily fabricated from wire and yet given a pleasing appearance by having the wire plated. The cooking rack can also be utilized in any type of open or closed cooking device such as an oven, a gas or charcoal grill.

The foregoing invention can now be practiced by those skilled in the art, such skilled persons will know that the invention is now necessarily restricted to the particular embodiments presented herein. The scope of the invention is to be defined by the terms of the following claims as given meaning by the preceding description.

I claim:

1. A multipurpose cooking rack for supporting a multiplicity and a variety of food items comprising:
    a body portion having a generally elongated configuration in a longitudinal dimension and a generally V-shaped configuration with respect to the longitudinal dimension;
    a plurality of support members forming said body portion and spaced apart to form openings therebetween;
    combine dual purpose handle and foot members connected to the ends of said body portion constructed and arranged to provide a handle when said rack is in one position and a foot when said rack is inverted; and
    food impaling members extending from the sides of said body portion and in generally the same direction as an apex of said V-shaped configuration;
    whereby said rack can accommodate a large piece of meat when said body portion is positioned with said apex of said V-shaped configuration in a down position and when inverted can accommodate a multiplicity of smaller pieces of meat or vegetables, said combined handle and foot members each having at least one portion extending substantially transversely to said longitudinal dimension so as to provide stability on a cooking grill as well as a handle irrespective of the position of said rack.

2. A multipurpose cooking rack for supporting a multiplicity and a variety of food items comprising:
    a body portion having a generally elongated configuration in a longitudinal dimension and a generally V-shaped configuration with respect to the longitudinal dimension;
    a plurality of wire support members forming said body portion and spaced apart to form openings therebetween, some of said wires forming said V-shaped configuration extending transversely to said longitudinal dimension;
    combined dual purpose handle and foot members also formed from wire support members, said handle and foot members extending from the ends of said body portion constructed and arranged to provide a handle when said rack is in one position and a foot member when said rack is inverted; and
    food impaling members also formed from at least some of said wire support members and extending from sides of said body portion and in generally the same direction as an apex of said V-shaped configuration;

whereby said rack can accommodate a large piece of meat when said body portion is positioned with said apex of said V-shaped configuration in a down position and when inverted can accommodate a multiplicity of smaller pieces of meat or vegetables, said combined handle and foot members each having at least one portion extending substantially transversely to said longitudinal dimension so as to provide stability on a cooking grill as well as a handle irrespective of the position of said rack.

3. The multipurpose cooking rack of claim 2 wherein said wire support members extend in longitudinal and transverse directions and at least one said wire support member extends longitudinally with respect to said body portion between said apex of said V-shaped configuration and end portions of said wire support members extending transversly to said longitudinal dimension.

4. The multipurpose cooking rack of claim 3 wherein said wire support members extending in a transverse direction are V-shaped.

5. The multipurpose cooking rack of claim 3 wherein at least two of said wire support members extend between said apex and said end portions.

6. The multipurpose cooking rack of claim 5 wherein said V-shaped configuration is formed in two arm portions with one of said wire support member extending between said apex and said end portions and connected to one arm and another wire support extends in a smaller manner and is connected to the other arm.

7. The multipurpose cooking rack of claim 3 wherein said wire support member extending longitudinally between said apex of the V-shaped configuration and said end portions of the wire support members are connected to said combined handle and foot members.

8. The multipurpose cooking rack of claim 2 wherein said combined handle and foot members are defined by opposing U-shaped members interconnected by leg portions.

9. The multipurpose cooking rack of claim 2 wherein all of said wire support members extending from said sides of said body portion terminate in said food impaling members.

10. The multipurpose cooking rack of claim 2 wherein said food impaling members extend from said sides of said body portion and are of a length to retain food items on said rack.

* * * * *

UNITED STATES PATENT AND TRADEMARK OFFICE
CERTIFICATE OF CORRECTION

PATENT NO.  : 4,848,217
DATED       : July 18, 1989
INVENTOR(S) : Koziol

It is certified that error appears in the above-identified patent and that said Letters Patent is hereby corrected as shown below:

| | |
|---|---|
| Column 1, line 7  | "reltates" should read --relates-- |
| Column 2, line 34 | "foot" should read --food-- |
| Column 2, line 55 | "been" should read --best-- |
| Column 2, line 67 | "wil" should read --will-- |
| Column 3, line 46 | "longtudinally" should read --longitudinally-- |
| Column 3, line 68 | "implacing" should read --impaling-- |
| Column 4, line 1  | "implaced" should read --impaled-- |
| Column 6, line 9  | "smaller" should read --similar-- |

Signed and Sealed this

Seventeenth Day of July, 1990

Attest:

HARRY F. MANBECK, JR.

Attesting Officer

Commissioner of Patents and Trademarks